US008036935B2

(12) United States Patent  
Burger et al.

(10) Patent No.: US 8,036,935 B2  
(45) Date of Patent: *Oct. 11, 2011

(54) COMPUTER SELF-SUPPORT MANAGEMENT

(75) Inventors: Gregory A. Burger, Dallas, TX (US); John M. Critz, Hurst, TX (US); Susan S. Giffin, Alamo, CA (US); Michael D. Graf, Cedar Hill, TX (US); Rob Maclaurin, Ontario (CA); Brett P. Newell, Carrollton, TX (US); Jason Sampson, Dallas, TX (US)

(73) Assignee: Accenture Global Services GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/904,778

(22) Filed: Oct. 14, 2010

(65) Prior Publication Data

US 2011/0041057 A1 Feb. 17, 2011

Related U.S. Application Data

(63) Continuation of application No. 10/235,152, filed on Sep. 5, 2002.

(51) Int. Cl.  
*G06Q 30/00* (2006.01)
(52) U.S. Cl. ...................... 705/14.27; 714/25
(58) Field of Classification Search .............. 705/14; 714/25  
See application file for complete search history.

(56) References Cited

U.S. PATENT DOCUMENTS

| 5,983,369 | A  | * | 11/1999 | Bakoglu et al. ............... 714/46 |
| 6,177,932 | B1 |   | 1/2001  | Galdes et al. |
| 6,357,017 | B1 |   | 3/2002  | Bereiter et al. |
| 6,477,531 | B1 |   | 11/2002 | Sullivan et al. |
| 6,564,220 | B1 | * | 5/2003  | Huber et al. ..................... 1/1 |
| 2002/0188360 | A1 | * | 12/2002 | Muramori et al. ............. 700/91 |
| 2003/0046157 | A1 |   | 3/2003 | Prorock |
| 2003/0083941 | A1 | * | 5/2003 | Moran et al. .................... 705/14 |
| 2003/0204422 | A1 |   | 10/2003 | Reich |
| 2003/0236701 | A1 | * | 12/2003 | Rowney et al. ................. 705/14 |
| 2004/0049394 | A1 |   | 3/2004 | Burger et al. |

FOREIGN PATENT DOCUMENTS

WO  WO 2004/023357 A2  3/2004

OTHER PUBLICATIONS

Tom Lichty, The Official America Online Tour Guide Version Three for Windows 3.1, 1996, Ventana, pp. 28-30 and 501-522.*  
Lichty, Tom, The Official America Online Tour Guide Version Three for Windows 3.1, *Ventana*, 1996, pp. 28-30 and 501-521.  
Office Action, dated Feb. 7, 2008, for U.S. Appl. No. 10/235,152, filed Sep. 5, 2002 (15 pages).  
Office Action, dated Aug. 21, 2008, for U.S. Appl. No. 10/235,152, filed Sep. 5, 2002 (17 pages).

(Continued)

*Primary Examiner* — John G. Weiss  
*Assistant Examiner* — M Hamilton  
(74) *Attorney, Agent, or Firm* — Finnegan, Henderson, Farabow, Garrett & Dunner, LLP

(57) ABSTRACT

A computer based technique for providing a list of selectable computer solutions in a self-support environment. The technique includes sending a computer solution to the client computer in response to a request from the client computer for the computer solution from the list. The computer solution includes at least an automated solution.

8 Claims, 3 Drawing Sheets

OTHER PUBLICATIONS

Office Action, dated Feb. 19, 2009, for U.S. Appl. No. 10/235,152, filed Sep. 5, 2002 (20 pages).
Office Action, dated Jul. 15, 2009, for U.S. Appl. No. 10/235,152, filed Sep. 5, 2002 (22 pages).
Advisory Action, dated Oct. 9, 2009, for U.S. Appl. No. 10/235,152, filed Sep. 5, 2002 (3 pages).
Office Action, dated May 14, 2010, for U.S. Appl. No. 10/235,152, filed Sep. 5, 2002 (17 pages).
Notice of Allowance and Allowability, dated Oct. 6, 2010, for U.S. Appl. No. 10/235,152 (13 pages), with Response to Office Action, filed Sep. 13, 2010, including listing of allowed claims (14 pages).
Search Report, dated Nov. 19, 2010, issued on European Appl. No. 10177909, including Notice from European Patent Office dated Oct. 1, 2007 concerning business methods, vol. 30, No. 11, Nov. 11, 2001 (6 pages).
PCT Declaration of Non-Establishment of International Search Report, dated Feb. 17, 2004, issued on PCT Appl. PCT/EP03/09835 (2 pages).
Search Report, dated Aug. 18, 2005, issued on European Appl. No. 03757789.7 (5 pages).
Office Action, dated Jul. 2, 2009, issued on Canadian Appl. No. 2,500,051 (4 pages).

* cited by examiner

COMPUTER SELF-SUPPORT MANAGEMENT

The present application is a continuation of U.S. application Ser. No. 10/235,152, filed Sep. 5, 2002, which is incorporated herein by reference in its entirety.

TECHNICAL FIELD

This invention relates to computer self-support management.

BACKGROUND

A typical enterprise may have a large number of computers distributed over wide geographic areas spanning across different cities or countries. The enterprise may provide support services and employ support personnel to handle computer related problems experienced by users and their computers. Support services may include, for example, providing several employees at each office location to assist with technical issues, especially hardware related where hands-on assistance is often required. Other personnel may be responsible for handling telephone technical support.

However, providing support services and personnel to handle computer problems during all periods may be costly and ineffective. For example, an enterprise may find it too costly to provide support personnel during non-working business hours. A user who encounters a computer problem during non-working business hours may have to wait until normal business hours to have the problem resolved. As a result, user productivity may be negatively impacted if many users encounter the same problem and have to wait until support personnel attend to the problem.

SUMMARY

In one implementation, a first aspect of the invention includes techniques for providing a list of selectable computer solutions in a self-support environment. The solutions includes at least an automated solution. The techniques include sending a computer solution to the client computer in response to receiving a request from the client computer for the computer solution from the list.

The aforesaid techniques may include providing incentives for a client computer to utilize the list. The incentive may include awarding points to the client computer for at least one of accessing the self-support environment, searching for a computer solution from the list, requesting a computer solution from the list, forwarding a computer solution to another client computer, answering questions provided by the self-support environment, providing feedback related to the success of the requested computer solution, and awarding a client computer with a prize for having a predetermined number points compared to another client computer.

The aforesaid technique also may include a computer solution having at least an automated solution and an instructional solution for performing a function on the client computer. The computer solution may include at least an industry standard solution and an enterprise specific solution. The list may be based on issues identified in the self-support environment.

The techniques also may include providing a short list of relevant computer solutions derived from the list and providing a list of computer solutions based on the location of the computer, wherein the location includes a geographic location. The usage of the self-support environment can be tracked based on a response from the client computer indicating the success of the requested computer solution. Self-support personnel can be notified based on a response from the client computer indicating the success of the requested computer solution.

The techniques also may include sending to the client computer real time network resource information, wherein the network resource may includes at least an electronic mail server and a network associated with the computer. The client computer also can be send support personnel contact information based on the location of the client computer. Contact information may include a telephone number and an electronic mail address. The client computer can be sent help information explaining the self-support environment. Such information may include at least text information, audio information, and video information.

In a second aspect, the invention provides an apparatus adapted to perform the methods disclosed in the first aspect.

In a third aspect, the invention provides an article comprising a computer-readable medium that stores computer executable instructions for causing a computer to perform the methods disclosed in the first aspect.

In a fourth aspect, the invention provides a method that includes providing an incentive for a client computer to utilize a self-support environment.

The method of the fourth aspect may include processing a request from the client computer for a computer solution from a list of selectable computer solutions, wherein at least one of the solutions is an automated solution. The incentive may include awarding points to the client computer for at least one of searching for a computer solution from the list, requesting a computer solution from the list, forwarding a computer solution to another client computer, and providing feedback related to the success of the requested computer solution.

The incentive also may include awarding points to the client computer for at least one of accessing the self-support environment, answering questions provided by the self-support environment, and awarding a prize to a client computer having a predetermined number of points compared to another client computer.

In a fifth aspect, the invention provides an apparatus adapted to perform the methods disclosed in the fourth aspect.

In a sixth aspect, the invention provides an article comprising a computer-readable medium that stores computer executable instructions for causing a computer to perform the methods disclosed in the fourth aspect.

In various implementations, the invention may provide one or more of the following advantages. The self-support system is capable of providing computer support solutions, which can be used alone, or in combination with current support services and personnel based on the needs of the enterprise. The system encourages users to access the system by providing incentives including awarding points to users who access the system. The system may provide customized support information such as computer solutions and contact information based on the location of the user. The system can provide status information of network resources associated with the user so as help the user be constantly aware of the status.

These features may help reduce user requests for information and assistance from support personnel because relevant information is automatically available. As a result, the cost of providing computer support in an enterprise may be reduced because users may be encouraged to use these automated features instead of contacting support personnel. Moreover, user productivity may increase because users may be more inclined to use these features to resolve a computer problem when support personnel may not be available to resolve the problem.

DESCRIPTION OF DRAWINGS

Like reference symbols in the various drawings indicate like elements.

DETAILED DESCRIPTION

Figure 1:
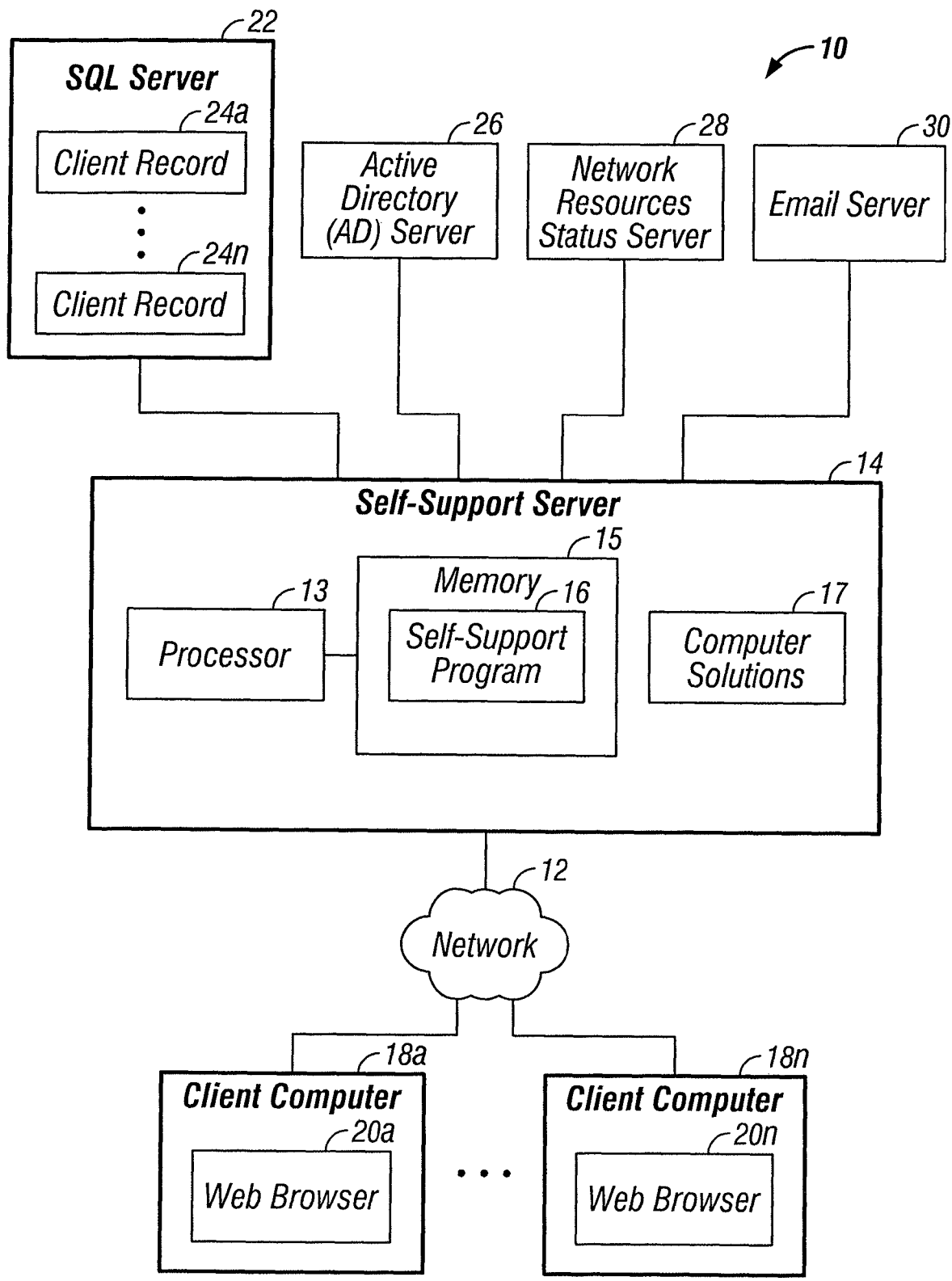
FIG. 1 is a simplified block diagram of a self-support computer management system in an enterprise according to an implementation of the invention.

FIG. 1 is a simplified block diagram of a self-support computer management system 10 in a self-support environment according to an implementation of the invention. The management system 10 includes a self-support server 14 that users can access using client computers 18a through 18n over a network 12. The server 14 can include a processor 13 for executing a self-support program 16 and processing data stored in memory 15. The self-support program 16 provides self-support functionality to users and handles requests for computer solutions 17 from the user. Computer solutions 17 may include programs and instructions related to computer problems that can be downloaded to the client computers 18a through 18n. Computer solutions 17 can be stored on the server in local storage as part of a database or on another server.

In one embodiment, the self-support program 16 can provide functionality such as, for example, access to computer solutions 17 in a self-support environment, incentives for utilizing the computer solutions 17, contact information of support personal who can provide additional assistance, network status information related to network resources such as the electronic mail (Email) server and networks, and help information for explaining the different aspects of the self-support functionality. Although the self-support server 14 may be used in an enterprise environment spanning geographic locations and organizational structures, the server can be used in other environments as well such as in a small business computing environment, as part of an organization (e.g. marketing department), or other environments.

The server 14 can deliver this functionality in the form of web pages using formats such as, for example, hypertext markup language (HTML), extensible markup language (XML), or other formats. The server 14 can include a common gateway interface (CGI) program for handling web page requests from the client computers 18a through 18n. The self-support server 14 can be configured to operate in a client/server system which may include client and server computers communicating over the network 12 using a protocol such as hypertext protocol (HTTP). An example of a network 12 can include a wired or wireless network such as the Internet, the World Wide Web, or other network. In addition to self-support program 16, the server 14 can include other programs such as an operating system, application programs, and device drivers.

A client computer, such as computer 18a, can include one or more computing devices such as, for example, a personal computer (PC), a personal digital assistant (PDA), or other computing devices capable of executing a web browser 20a. The web browser 20a is a program that can view web pages sent by the server 14. The client computer 18a can access the web pages from the server 14 using access techniques such as sending requests for web pages using HTTP, a uniform resource locator (URL) associated with the web page, or other techniques.

The self-support server 14 can be configured to communicate with support servers including a structured query language (SQL) server 22, an active directory (AD) server 26, a network resources server 28, and an Email server 30. The server 14 can communicate with these support servers using HTTP communication means such as wireless, wired, or other communication means. Moreover, the functionality of the support servers (22, 26, 28, and 30) can be integrated with the server 14 or distributed among one or more computers.

The SQL server 22 can include one or more computers having one or more programs for processing a database. The database can handle user data including client records 22a through 22n for client computers 18a through 18n respectively. For example, a client record can be used to store information such as personnel information including a personal number identifying a user, password, location information associated with the client computer, incentive information such as number of points that the client computer has been awarded for accessing the features of the server 14, the number and type of computer solutions 17 accessed, or other information.

The AD server 26 can include one or more computers configured as a centralized and standardized system that can automate network management of user data, security and distributed resources, and can enable interoperation with directories in other systems. For example, the AD server 26 can contain a record for each user in a network. The server 26 can verify user information, such as a username and password, received from the user by comparing received information with user information stored in the user record on the server.

The network resources server 28 can include one or more computers capable of maintaining status information of shared network resources such as, for example, an Email server, a network associated with the client computer 18a in an enterprise, or other resources. The client computer 18a in one location of the enterprise may be associated with network resources that may be different than network resources assigned to another client computer in a different location of the enterprise. The self-support server 14 can request status information from the server 28 and then forward this information to the client computer 18a in the form of a web page. These features may help reduce user requests for status information from support personnel because this information may be automatically provided to the user.

The Email server 30 can include one or more computers having programs configured to handle Email messages for the client computer 18a. Email is one of the protocols in the transport control protocol/Internet protocol (TCP/IP) suite of protocols. In one embodiment, the Email server 30 can send Email messages using a protocol such as simple mail transfer protocol (SMTP) or other protocol. The server 30 can receive Email messages using a protocol such as post office protocol 3 (POP3), Internet message access protocol (IMAP), or other protocol.

Although not shown, the self-support system 10 can provide support personnel access to the system 10 using computers coupled to the server 14. Support personnel can provide services such as local technology services (LTS), help desk services (HDS), or other services. LTS services may include having several employees at each office location to assist with technical issues, especially hardware related where hands-on assistance is often required. HDS services may include providing personnel responsible for handling telephone technical support. The functionality of the self-support server 14 can be provided alone or in combination with support services and personnel.

Figure 2:
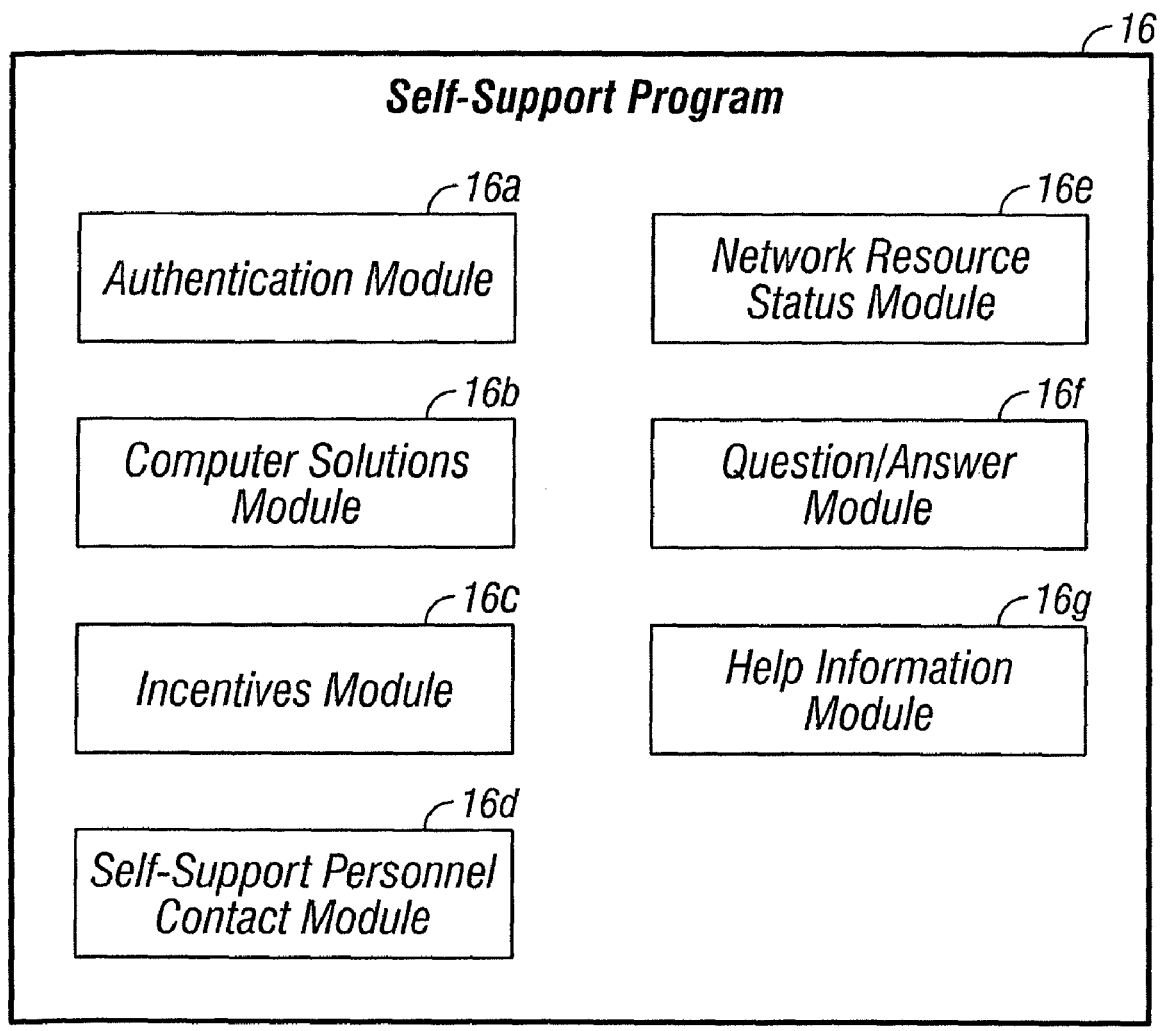
FIG. 2 is a detailed block diagram of a self-support module in a self-support system according to an implementation of the invention.

FIG. 2 is a detailed block diagram of the self-support program 16 according to an implementation of the invention. The self-support program 16 can include program modules containing software instructions for implementing the functionality of the self-support system 10. Such functionality includes, in one embodiment, an authentication module 16a, a computer solutions module 16b, an incentives module 16c, a self-support personnel contact module 16d, a network resource status module 16e, a question/answer module 16f, and a help information module 16g. The authentication module 16a may be responsible for determining whether a client computer, such as computer 18a, is authorized to access the functionality provided by the self-support system 10. In one embodiment, the module 16a may be a program that provides a "login" web page that may permit the user associated with the client computer 18a to gain access to the self-support system 10. The user may attempt to access the system 10 by entering access information such as a username and password onto the "login" web page. The server 14 receives this access information and forwards it to the AD server 26 where it may be verified. If the user is not authorized to access the system 10, the server 14 can send the user an "access denied" web page with a message indicating that access has been denied.

On the other hand, if the user is authorized to access the system 10, the server 14 retrieves from the AD server 26 user information such as the user's name, location information, personnel number identifying the user, or other information. The server 14 can use this information to personalize web pages sent to the client computer 18a. The server 14 updates the client record 24a on the SQL server 22 with the retrieved user information associated with the client computer 18a. As part of the incentives module 16c described in further detail below, the user may be awarded a predetermined number of points for accessing features of the program 16. Once the user has been authorized to access the server 14, the user may be redirected to a "home" web page which may provide access to some or all of the functionality of the program 16. The "home" page can include standard display objects such as hyper links to other web pages containing additional support related information.

The computer solutions module 16b can be, in one embodiment, one or more programs that can maintain computer solutions 17 on the server 14 and process requests for the computer solutions. The computer solution 17 can include solutions for performing a function on the client computer 18a, such as automated solution, an instructional solution, or other solution.

An automated solution refers to a script program created in a program language, such as visual basic (VB) or other language, which may include software instructions for performing a function on the client computer 18a. The automated solution communicates with other programs, such as an operating system and application programs, residing on the client computer 18a to perform its tasks. An automated solution can automatically perform functions on the client computer 18a such as, for example, clean a hard drive, delete temporary files, change system settings, install printer drivers, or other functions. Although the automated solution may perform these functions automatically, the solution may provide prompts to the user to for additional information. For example, a function that cleans a hard drive on the client computer 18a may prompt the user with a question asking which hard drive should be cleaned.

On the other hand, an instructional solution may provide step-by-step instructions for performing a function on the client computer 18a. For example, an instructional solution can provide instructions on how to free up hard drive space, change an Email signature to conform to a company standard, detect and repair disk errors, or other instructions related to the client computer 18a.

The computer solution 17 also can include an industry standard solution as well as an enterprise specific solution. An industry standard solution refers to an automated or an instructional solution directed to a standard application such as an operating system, word processor, spreadsheet, Email program, other standard application. In addition, a standard solution may include instructions on how to use features in standard applications such as, for example, how to use a mathematical function to count objects in a spreadsheet program, how to add a web page to "favorites" menu in a web browser, or other features. On the other hand, an enterprise specific solution refers to a solution that may have been tailored to the needs of the enterprise. Examples may include instructions on how to perform tasks such as how to use a time entry program, how to establish a dialup networking connection, how to connect to a particular printer, or other tasks that are specific to the enterprise.

The computer solutions module 16b can generate a list of selectable computer solutions and deliver the list to the client computer 18a over the network 12. In one embodiment, the module 16b creates a "solutions index" based on the computer solutions 17 stored on the server 14. The "solutions index" can be stored in the SQL server 22 for subsequent retrieval. The "solutions index" can be created using an indexing means such as a search engine, an indexing function/service of an operating system, or other indexing means. The module 16b can use the "solutions index" to search for and retrieve a computer solution 17 requested by the client computer 18a.

The client computer 18a can request a solution 17 by forming a query directed to a computer problem experienced by the user. The query can be entered in a standard "search" box as part of a web page sent by the module 16b. The module 16b receives the query and processes the query by retrieving and searching the "solutions index" for one or more solutions based on contents of the query. The module 16b can send the client computer 18a a "solutions" web page that includes a list of computer solutions from the "solutions index" that matches the query. The user can then select one or more solutions from the list and send the selection to the server 14. In response, the server 16b retrieves the solution from the server 14 and downloads it to the client computer 18a for execution on the computer. In one embodiment, "hyper links" can be used to reference the computer solutions 17.

The query can be formed using a natural language search text string. The user can narrow the search by defining the problem or issue facing the user. For example, the user can provide information such as the type of application experiencing a problem, the task the user is attempting to accomplish with the application, an error message that appears when using the application, or other information. Thus, the user can provide information to conduct a search for a problem similar to the information required when seeking assistance from support personnel. However, using these features of the self-support program 16 may be more cost effective than contacting support personnel.

The computer solutions module 16b can provide a complete list of computer solutions to the client computer 18a. In one embodiment, the module 16b can provide a web page containing the complete list as well as a means to search or browse the list. The complete list can be a hierarchical structure grouping the solutions according to categories such as hardware, software, or other categories. This may allow the user to view or browse all the categories of solutions and select a solution that matches the problem or question facing the user. As discussed above, the module 16b processes the request for the selected solution by retrieving it from the server 14 and sending it to the user for subsequent execution on the client computer 18a.

The list of computer solutions can be based on issues affecting the enterprise or the support environment. For example, computer support personnel, such as a system administrator or help desk representative, may receive complaints related to computer problem experienced by users. The support personnel may decide to create a computer solution addressing the complaint based on factors such as the volume of the complaints, the nature of the complaints, as well as other factors. The support personnel can then generate a "hot topics" web page describing a problem recently experienced by users in the enterprise. The web page can contain formation related to the problem as well as a hyperlink to a computer solution 17 for resolving the problem. In this way, users in the enterprise may resolve a problem by requesting a computer solution 17 instead of contacting support personnel. The cost of an automated computer solution may be lower than the cost of having support personnel handle the same problem. As a result, the cost of providing computer support in an enterprise may be reduced.

The computer solutions module 16b can create a computer solution as a result of the distribution of a new version of a program to users in an enterprise. For example, the marketing department in the enterprise may contact support personnel to notify them that they intend to distribute a new version of a customer contact program. The program may require an explanation on how to use a new feature of the program. The support personnel can then collaborate with marketing department personnel to create an instructional type of computer solution that provides step-by-step instructions on how to use the new feature before the program is distributed. The module 16b can post a link to the computer solution 17 on the "hot topics" web page described above which, in combination with incentives for using the solution, may encourage users to request the computer solution 17 instead of contacting support personnel.

In another embodiment, the computer solutions module 16b can provide a short list of relevant computer solutions derived from the list of computer solutions. For example, support personnel can use the module to create a "top ten" web page listing the top ten computer solutions to computer problems based on factors such as recent occurrences of a computer problem identified by support personnel, a distribution of a new program or a new version of program, or other factors.

The list of computer solutions sent to the client computer 18a can be customized based on the location of the client computer. The location of the client computer 18a can include, for example, the geographic location of the client computer, the organizational location of the client computer within the enterprise, or other location. For example, a user in the marketing department of the European division of a global company may receive a list of computer solutions based on the location of the client computer within the organization (e.g. the marketing department) and the geographic location of the client computer (e.g. Europe). As a result, the module 16b provides a customized list of computer solutions that may be most relevant to the user.

The computer solutions module 16b can provide a feature to allow the user to provide feedback indicating the success of the requested computer solution. For example, the module 16b can provide a "call back" web page which can be sent to the user after the user has requested or executed a computer solution 17. The web page can prompt the user to provide information related to the computer solution such as, for example, whether the solution resolved the problem experienced by the user. This feature may permit the server 14 to track the usage of the self-support environment including trends related to the computer problems, success rate of the computer solutions, or other trends. This may allow support personal to determine whether the computer solution 17 is adequate or whether the solution should be modified. Moreover, the "call back" page may provide the user the ability to request and notify support personnel that the user requires additional assistance in resolving the problem. As part of the incentives module 16c, the user may be awarded a predetermined number of points for providing feedback regarding the computer solution 17.

The computer solutions module 16b also may allow the client computer 18a to forward a computer solution 17 to another the client computer in the enterprise. For example, the module 16b may present a "Email" web page to the client computer 18a allowing the user to specify the computer solution the user wishes to send to another user. The Email address of the users may be selected from a list of existing Email addresses or the user can enter the Email address of the user into a field on the web page. As part of the incentives module 16c, the user sending an Email message as well as the user receiving the Email message may be awarded a predetermined number of points for accessing and sharing the computer solution 17.

The incentives module 16c may provide the client computer 18a with incentives for using different features of the self-support program 16. For example, the module 16c can send an "incentives" web page to the client computer 18a with information such as how incentives operate, how points are awarded, the number of points the user has accumulated during a period of time, or other information. Incentives may including awarding points each time the user is engaged in activity such as searching for a computer solution from the list, requesting a computer solution from the list, forwarding a computer solution to another client computer, answering questions provided by the self-support environment, providing feedback related to the success of the requested computer solution, or other activity.

The module 16c keeps track of the total number of points accumulated by a client computer during a period of time. For example, the module 16c may update the client record 24a associated with client computer 18a with a predetermined number of points each time the user is involved in predefined activity. At a particular point in time, such as at the end of the month, a prize may be awarded to a user who has accumulated a predetermined number points compared to a threshold or to another client computer. By providing incentives, users may be encouraged to use the self-support system 10 for solutions to computer related problems instead of contacting support personnel. This may help reduce the cost of providing technical support to users and their computers in an enterprise.

The self-support personnel contact module 16d provides contact information of support personnel based on the location of the client computer 18a. The contact information can include, for example, a telephone number, an electronic mail address, or other contact information of support personnel. For example, a client computer located in Europe may be provided a "contact" web page that contains support contact information of support personnel located in Europe. In a global enterprise, a client computer located in Europe may have a computing environment that may be different than the computing environment of a client computer located in North America. Thus, the support personnel located in Europe may be more effective in resolving the user problem because they may be familiar with the client computer's computing environment such as computer problems encountered and applicable solutions than support personnel located in North America.

The network resource status module 16e may be capable of managing information related to network resources in the enterprise. The network resource may include, for example, an Email server, a network, or other network resources associated with a client computer. The module 16e may be configured to periodically receive status information and forward this information to client computers in the enterprise in substantially real time. For example, the client computer 18a may receive an "outage" web page providing status information of a network and an Email server associated with the client computer. The status information can be periodically updated by the module 16e and the information may be in a format that is easily recognizable to the user. The information can include the name of the resource (e.g. device name, device type), outage time information (e.g. time an outage occurred and expected time of recovery), location (e.g. country, region, city), and severity level (e.g. severe, warning). These features may reduce the need for a user to contact support personnel to determine the status of a network resource because the user is provided with this information automatically and in substantially real-time.

The question/answer module 16f may provide a user with a "trivia" web page that offers information such as trivia and technology related facts. The user may able to test his/her knowledge, and in some embodiments, compare this knowledge to other users. The module 16f can offer the information in a format such as multiple-choice, informational, question/answer, or a combination of other formats. For example, a multiple-choice format may allow the user to choose an answer from among one or more options. An informational format may include a statement to convey a message or a fact. A yes/no format, as the name implies, may allow the user to respond with a "yes" or "no" to a statement or question. The information can be updated on a periodic basis such as daily. As part of the incentives module 16c, the user may be awarded a predetermined number of points for accessing this feature.

The help information module 16g may provide the client computer 18a with information, such as, a description of the features of the self-support environment as well as how to use these features. For example, the module 16g can provide this help information using a "help" web page the may deliver the information in formats such as text, audio, video, a combination of these formats or other formats.

Figure 3:
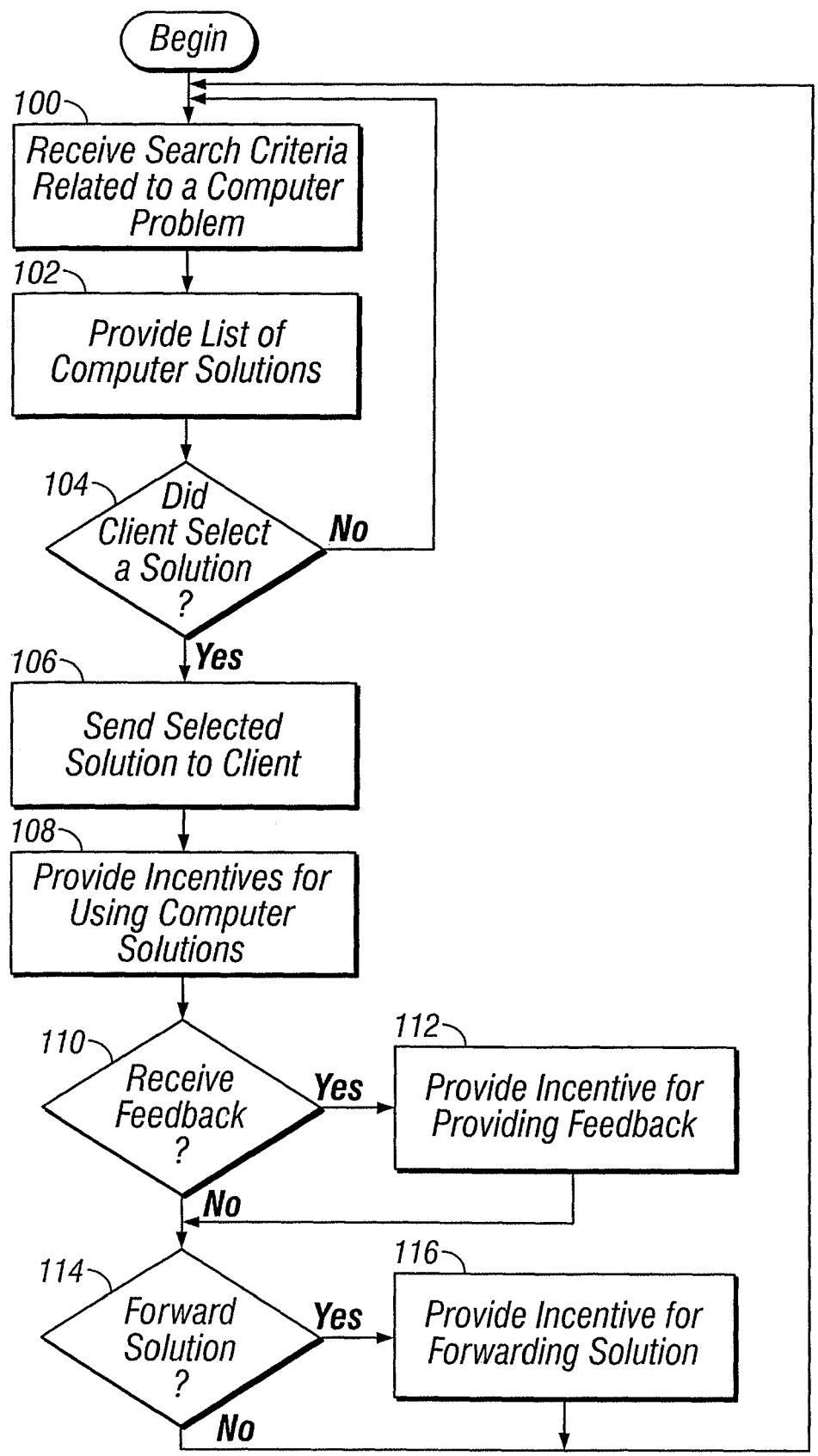
FIG. 3 is a flow chart of a self-support process according to an implementation of the invention.

FIG. 3 is a flow chart of a self-support process according to an implementation of the invention. To illustrate the process, in an example scenario, a user may experience a computer related problem in an enterprise and desires to access the functionality of the self-support program 16 to resolve the problem. The user attempts to access (i.e. login) the server 14 using the client computer 18a by sending access information to the server. As described above, the authentication module 16a receives the access information and determines whether the user is authorized to access the server 14.

If the user is authorized to access the server 14, the support program 16 sends the user a web page which may enable the user to enter a query with search criteria directed to the computer related problem. The support program 16 receives the query (block 100) and searches a previously created "solution index" for computer solutions that may match the search criteria.

If a match is found, the server program 16 can provide (block 102) the user a list of selectable computer solutions 17. The list can be sent using a web page and can include references (links) to computer solutions such as an automated solution, an instructional solution, industry standard solution, enterprise specific solution, a customized solution based on the location of the user, or other solution.

The support program 16 determines (block 104) whether the user has selected a computer solution from the list. If the user does not make a selection, then the program 16 continues to monitor for a request or returns to the beginning of the process (block 100) in anticipation of a new query. On the other hand, if the user has selected a solution from the list, the user sends the server 14 a response that identifies the selected solution.

Once the server 14 receives the response, the program retrieves the selected solution from the server 14 and sends (block 106) the solution to the user. The user can then, based on the type of computer solution, execute the solution (program solution) or follow instructions (instructional solution) to resolve the problem.

The support program 16 provides (block 108) incentives for the user of a client computer to utilize the self-support environment. For example, the incentives module 16c may award points to the user for accessing features of the program 16 such as requesting a computer solution from the list.

Once the user has executed the selected computer solution, the support program 16 determines (block 110) whether the user has provided feedback related to the selected computer solution. The feedback response can include information indicating the success of the requested computer solution. This information can be used track usage of the self-support environment as well as the effectiveness of the requested solution. The response also can include a request that support personnel be notified to provide additional assistance in resolving the problem. As described above, the support program 16 provides (block 112) incentives such as awarding a predetermined number of points to the user for providing feedback.

The support program 16 determines (block 114) whether the user has forwarded the selected computer solution to another user. For example, the user can forward the solution by sending an Email message containing a reference (hyperlink) to the computer solution to another user. If the user has forwarded the solution, then the program 16 may provide (block 116) an incentive for using this feature of the program such as awarding points to the user. As part of the incentives feature, the program can enter users into a contest and award a user with a prize for having a predetermined number points compared to another user or to a threshold number of points.

The process can then resume to block 100 where it can monitor for user requests such as queries for a computer solution. The process discussed above also can provide a web page that includes information such as user real time network resource information, support personnel contact information based on the location of the user, computer help information explaining the features of the self-support environment, or other information.

A number of embodiments of the invention have been described. Nevertheless, it will be understood that various modifications may be made without departing from the spirit and scope of the invention. For example, the techniques described above can be integrated with other applications such as a program that restores applications residing on a client computer to a previous state. Accordingly, other embodiments are within the scope of the following claims.

What is claimed is:

1. A method comprising:

providing a list of selectable computer solutions in a self-support environment, wherein at least one of the solutions is an automated solution;

providing a client record associated with a client computer;

depositing points into the client record when the client computer utilizes the list, wherein points are deposited into the client record for at least one of:

accessing the self-support environment, searching for a computer solution from the list, requesting a computer solution from the list, forwarding a computer solution to another client computer, and answering questions provided by the self-support environment;

receiving a request from the client computer for a computer solution from the list;

sending the requested computer solution to the client computer in response to the request, wherein when the requested computer solution is an automated solution, the automated solution can communicate with other programs on the client computer and automatically perform functions on the client computer;

updating, by a processor, the client record associated with the client computer with the points deposited for the request for a computer solution from the list; and updating, by the processor, the client record associated with the client computer to indicate the awarding of a prize when the client record associated with the client computer has a predetermined number of points compared to another client record associated with a different client computer.

2. The method of claim 1, wherein the computer solutions include at least an industry standard solution and an enterprise specific solution.

3. The method of claim 1, wherein the list is based on issues related to the self-support environment.

4. The method of claim 1, further comprising providing a short list of relevant computer solutions derived from the list.

5. The method of claim 1, further comprising tracking usage of the self-support environment based on a response from the client computer, wherein the response indicates success of the requested computer solution.

6. The method of claim 1, further comprising notifying self-support personnel based on a response from the client computer, wherein the response indicates success of the requested computer solution.

7. The method of claim 1, further comprising sending to the client computer support personnel contact information based on location of the client computer, wherein the contact information includes a telephone number and an electronic mail address.

8. The method of claim 1, further comprising sending to the client computer help information explaining the self-support environment, the information includes at least text information, audio information, and video information.

* * * * *

UNITED STATES PATENT AND TRADEMARK OFFICE
CERTIFICATE OF CORRECTION

PATENT NO. : 8,036,935 B2  Page 1 of 1
APPLICATION NO. : 12/904778
DATED : October 11, 2011
INVENTOR(S) : Gregory A. Burger et al.

It is certified that error appears in the above-identified patent and that said Letters Patent is hereby corrected as shown below:

ON THE TITLE PAGE:

Item (73) Assignee: "Accenture Global Services GmbH, Schaffhausen (CH)" should read --Accenture Global Services Limited, Dublin 4, IRELAND--

Signed and Sealed this
Tenth Day of April, 2012

David J. Kappos
*Director of the United States Patent and Trademark Office*